US009863459B2

(12) United States Patent
Gallant et al.

(10) Patent No.: US 9,863,459 B2
(45) Date of Patent: Jan. 9, 2018

(54) THREADED FASTENER LOCK (71) Applicant: UNITED TECHNOLOGIES CORPORATION, Farmington, CT (US)

(72) Inventors: Kelton Gallant, Cromwell, CT (US); Barry William Spaulding, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 6 days.

(21) Appl. No.: 14/692,428

(22) Filed: Apr. 21, 2015

(65) Prior Publication Data

US 2015/0308485 A1    Oct. 29, 2015

Related U.S. Application Data (60) Provisional application No. 61/983,265, filed on Apr. 23, 2014.

(51) Int. Cl.
*F16B 21/18* (2006.01)
*F16B 41/00* (2006.01)
*F01D 25/24* (2006.01)

(52) U.S. Cl.
CPC .......... *F16B 41/002* (2013.01); *F01D 25/246* (2013.01); *F16B 21/183* (2013.01); *F05D 2230/64* (2013.01); *F05D 2250/281* (2013.01)

(58) Field of Classification Search
CPC ....... F16B 41/02; F16B 21/183; F01D 25/246
USPC ........ 411/103, 517, 518, 521, 522, 520, 918
See application file for complete search history.

(56) References Cited

U.S. PATENT DOCUMENTS

| 1,352,643 | A | * | 9/1920 | Young | F16B 39/10 411/248 |
| 2,755,698 | A | * | 7/1956 | Wurzel | F16B 21/186 411/517 |
| 2,933,970 | A | * | 4/1960 | Pagano | F16B 21/16 411/517 |
| 4,142,704 | A | * | 3/1979 | Murray | F16B 21/183 248/680 |
| 4,692,079 | A | * | 9/1987 | Killian | F16B 21/183 411/353 |
| 4,886,408 | A | * | 12/1989 | Killian | B21D 53/20 411/519 |

(Continued)

FOREIGN PATENT DOCUMENTS

| DE | 10015911 A1 | 10/2001 |
| DE | 102012215872 A1 | 3/2014 |

(Continued)

OTHER PUBLICATIONS

European Search Report for EP Application No. 15164872.2 dated Aug. 31, 2015.

*Primary Examiner* — Gary Estremsky
(74) *Attorney, Agent, or Firm* — Cantor Colburn LLP (57) ABSTRACT The present disclosure relates generally to a fastener lock for engaging a threaded fastener. The fastener lock defines a discontinuous circular opening therethrough with at least one extending tab extending into the discontinuous circular opening. When a threaded fastener is disposed in the discontinuous circular opening, the at least one extending tab engages the threads of the threaded fastener.

12 Claims, 8 Drawing Sheets

(56) References Cited

U.S. PATENT DOCUMENTS

| | | | |
|---|---|---|---|
| 5,615,582 A * | 4/1997 | Rupp | B62D 3/12 |
| | | | 74/422 |
| 7,690,698 B1 | 4/2010 | Curran | |
| 8,316,530 B2 * | 11/2012 | Rode | B25B 27/062 |
| | | | 29/252 |

FOREIGN PATENT DOCUMENTS

| | | |
|---|---|---|
| WO | 2007024326 A1 | 3/2007 |
| WO | 2007096241 A1 | 8/2007 |

\* cited by examiner

THREADED FASTENER LOCK

CROSS REFERENCE TO RELATED APPLICATION

This application claims the benefit of and incorporates by reference herein the disclosure of U.S. Ser. No. 61/983,265, filed Apr. 23, 2014.

TECHNICAL FIELD OF THE DISCLOSURE

The present disclosure is generally related to fasteners and, more specifically, to a threaded fastener lock.

BACKGROUND OF THE DISCLOSURE

In gas turbine engines and other applications, it is not uncommon for an assembly to require the use of a blind fastener, where access to a fastener is obstructed by surrounding structure with little room in which to maneuver. In these situations, the fastener may only be accessed by a tool and direct observation of the fastener is not possible during removal, nor is there room for the tool to withdraw the fastener after it has been backed out of the threaded surface with which it was engaged. The inability to withdraw the unfastened fastener may hinder further disassembly of the structure. Improvements in this area are therefore needed.

SUMMARY OF THE DISCLOSURE

In one embodiment, an assembly is disclosed comprising: an upper component including an upper recess formed therethrough, the upper component further including an upper component wall; a lower component including a lower recess formed therethrough; a lock recess formed through the upper component wall and intersecting the upper recess; and a fastener lock at least partially disposed within the lock recess, the fastener lock including a discontinuous circular opening formed therethrough and at least one extending tab disposed on a periphery of the discontinuous circular opening.

In a further embodiment of the above, a threaded insert is at least partially disposed within the lower recess.

In a further embodiment of any of the above, the lower recess is threaded.

In a further embodiment of any of the above, a diameter of the lock recess is greater than a diameter of the upper recess.

In a further embodiment of any of the above, the fastener lock comprises a discontinuous washer having a void formed therein, the void defining two fastener lock ends on either side thereof.

In a further embodiment of any of the above, a hole is formed through each of the two fastener lock ends.

In a further embodiment of any of the above, an extension is disposed on at least one of the fastener lock ends, wherein an axis of the extension forms a non-zero angle with an axial plane in which the remainder of the fastener lock is disposed.

In a further embodiment of any of the above, a cavity is formed into the lock recess, wherein the cavity defines at least one cavity wall and rotation of the fastener lock is limited by interaction between the extension and the at least one cavity wall.

In a further embodiment of any of the above, a diameter of the fastener lock in a relaxed state is greater than a diameter of the upper recess.

In a further embodiment of any of the above, the fastener lock is formed from stainless steel.

In a further embodiment of any of the above, a height of the lock recess allows the fastener lock to be disposed in a position where a fastener lock axial plane is non-parallel to a lock recess axial plane.

In a further embodiment of any of the above, a threaded fastener is disposed in the upper recess and extending through the opening such that the at least one extending tab engages a thread of the threaded fastener.

In a further embodiment of any of the above, the lock recess comprises a central portion defining a central portion diameter, a distal portion and a proximal portion, the proximal portion extending through the upper component wall.

In a further embodiment of any of the above, a width of the proximal portion is less than the central portion diameter.

In a further embodiment of any of the above, a distal extension is disposed within the distal portion of the lock recess, wherein interaction between the distal extension and the distal portion of the lock recess limits rotation of the fastener lock.

In another embodiment, a fastener lock is disclosed comprising: a body defining a discontinuous circular opening therethrough; at least one extending tab disposed on a periphery of the discontinuous circular opening and extending into the discontinuous circular opening In a further embodiment of the above, the body comprises a discontinuous washer having a void formed therein, the void defining two fastener lock ends on either side thereof.

In a further embodiment of any of the above, an extension is disposed on at least one of the fastener lock ends, wherein an axis of the extension forms a non-zero angle with an axial plane in which the remainder of the fastener lock is disposed.

In a further embodiment of any of the above, a distal extension is disposed on the body substantially opposite the two fastener lock ends.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
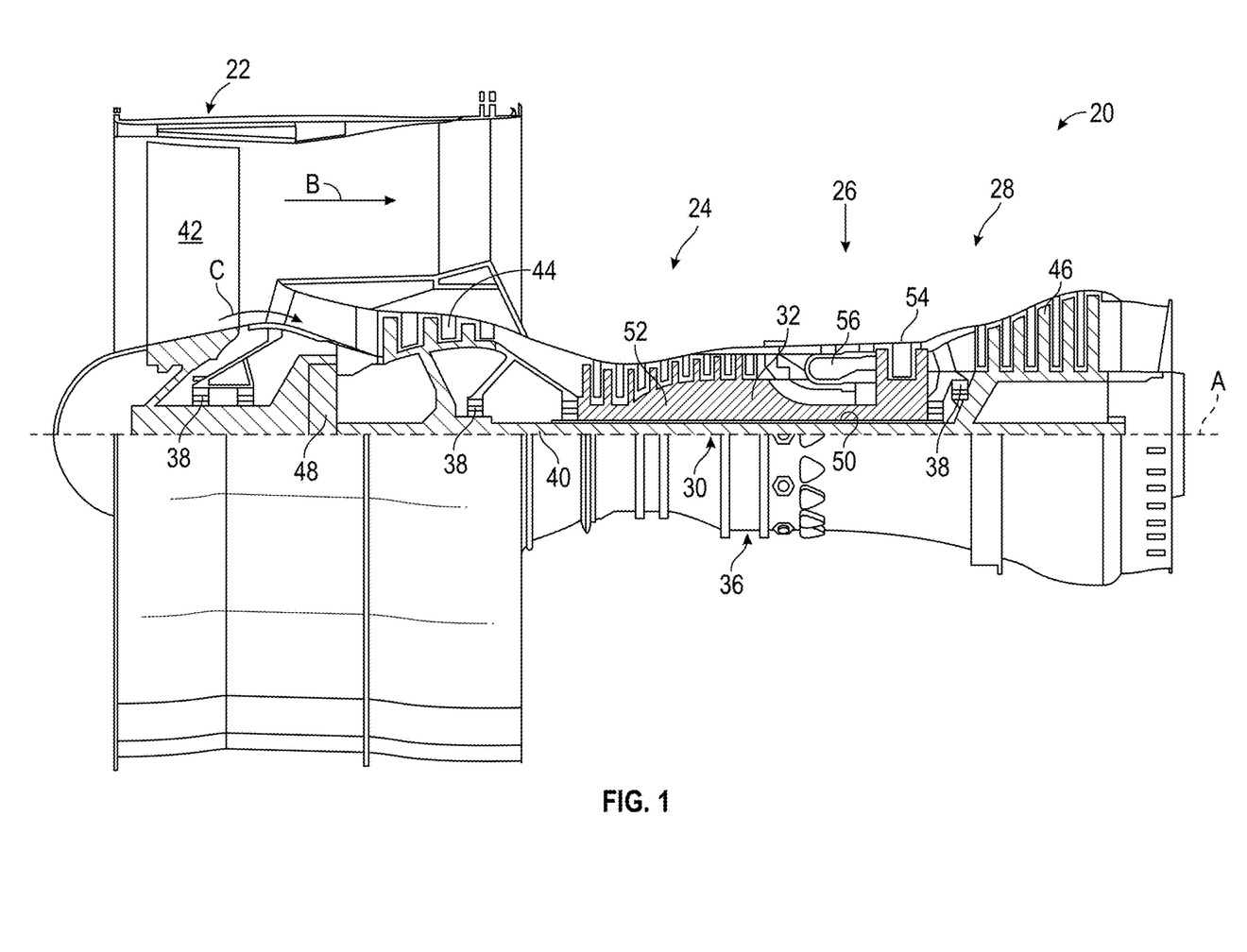
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 m/sec).

Figure 2:
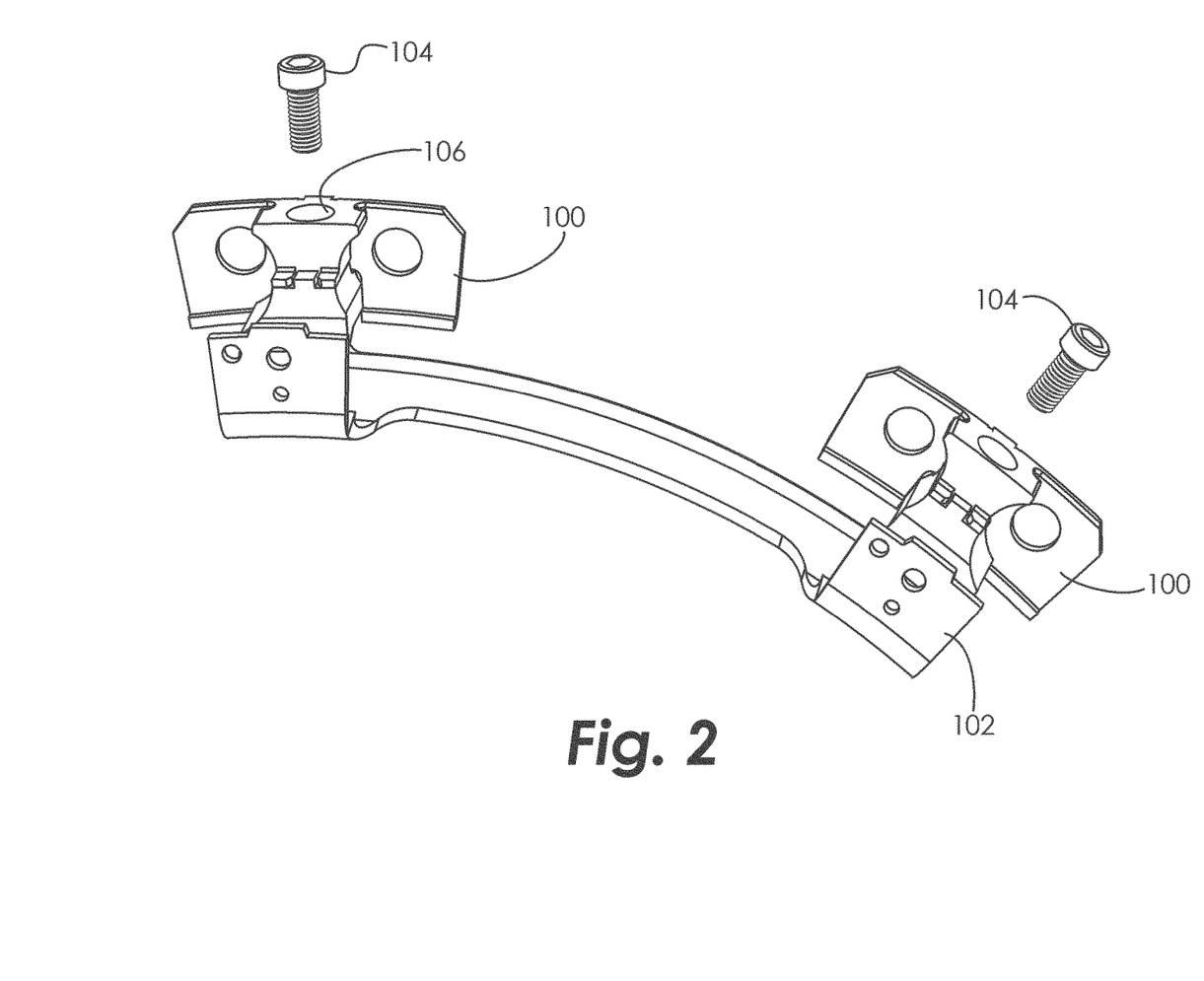
FIG. 2 is a schematic perspective view of component assembly in an embodiment.
Figure 3:
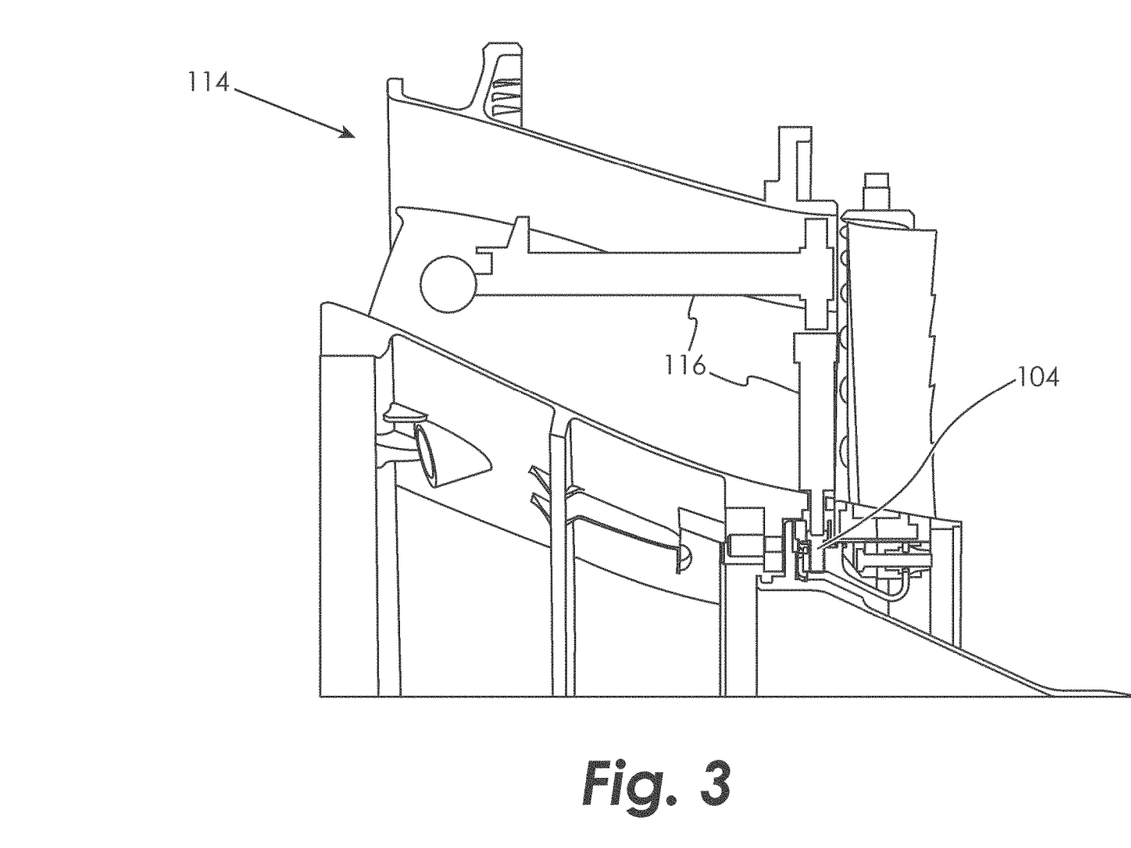
FIG. 3 is a schematic cross-sectional view of the component assembly of FIG. 2 installed in a gas turbine engine in an embodiment.
Figure 4:
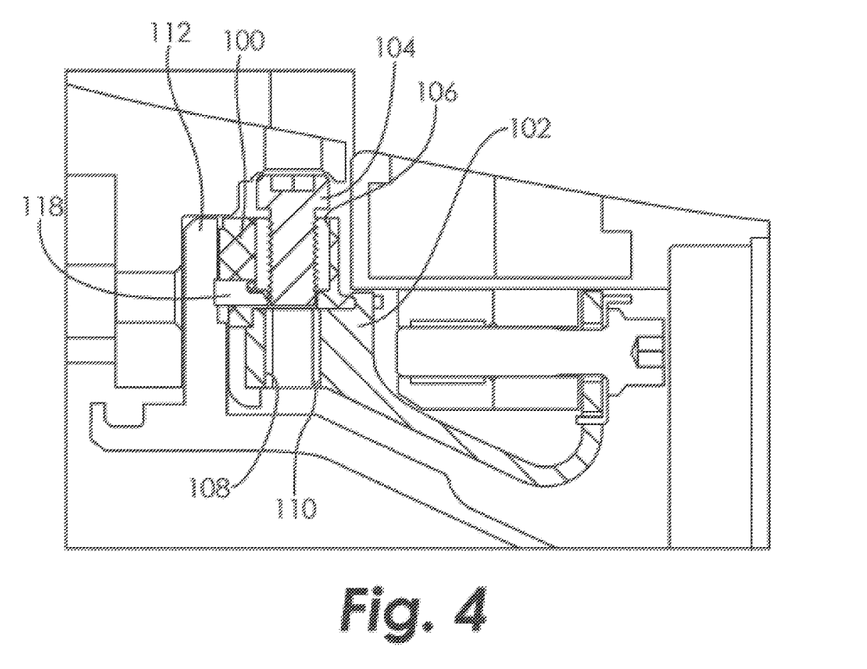
FIG. 4 is a schematic cross-sectional close-up view of the component assembly of FIG. 3 in an embodiment.

FIGS. 2-4 schematically illustrate one embodiment of an assembly where the inability to retain a blind fastener after it has been backed out of the threaded surface with which it was engaged hinders further disassembly of the assembly. An upper component 100 is coupled to a lower component 102 by at least one threaded fastener 104, such as a bolt, to name just one non-limiting example. The fastener 104 extends through an upper recess 106 formed through the upper component 100 and a lower recess 108 (see FIG. 4) formed in the lower component 102. In one embodiment, a threaded insert 110 (see FIG. 4) is disposed within the lower recess 108. In another embodiment, the lower recess 108 is threaded and a threaded insert is not required. In the gas turbine engine embodiment shown in FIGS. 3-4, the upper bracket 100 is coupled to the number two bearing support 112.

The upper component 100 is secured to the lower component 102 by extending the threaded fastener 104 through the upper recess 106 and engaging the threads of the fastener 104 with the threads of the threaded insert 110. As shown in FIG. 3, access to the bolt 104 is made through a compartment 114 by use of a tool 116. Because of the shape of the compartment 114, there is not enough room to back out the fastener 104 and remove it with the tool 116. Additionally, as can be seen in FIG. 4, once the fastener 104 is backed out of the threaded insert 110, if it is not retained within the upper recess 106 it will simply fall back into the lower recess 108. In this situation, the extension of the fastener 104 into the lower recess 108 prevents removal of the upper component 100, the bearing support 112 and the threaded fastener 104 in an axial direction (i.e., perpendicular to the axis of the fastener 104), as is required for removal of these components. To prevent this from happening, a fastener lock 118 is currently used to retain the fastener within the upper recess 106. However, the fastener lock 118 is formed from polyimide and is relatively expensive as several of them are needed to secure the several components used in the gas turbine engine. Additionally, the fastener lock 118 is loose when the upper component 100 is removed, making the fastener lock 118 a concern for causing foreign object damage in the gas turbine engine if the fastener lock 118 fell from its desired position.

Figure 5:
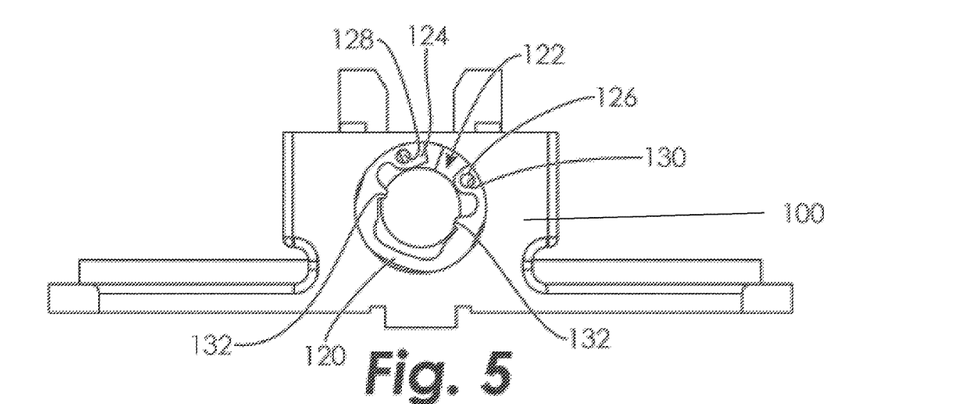
FIG. 5 is a schematic plan view of a blind fastener retainer installed on a component in an embodiment.
Figure 6:
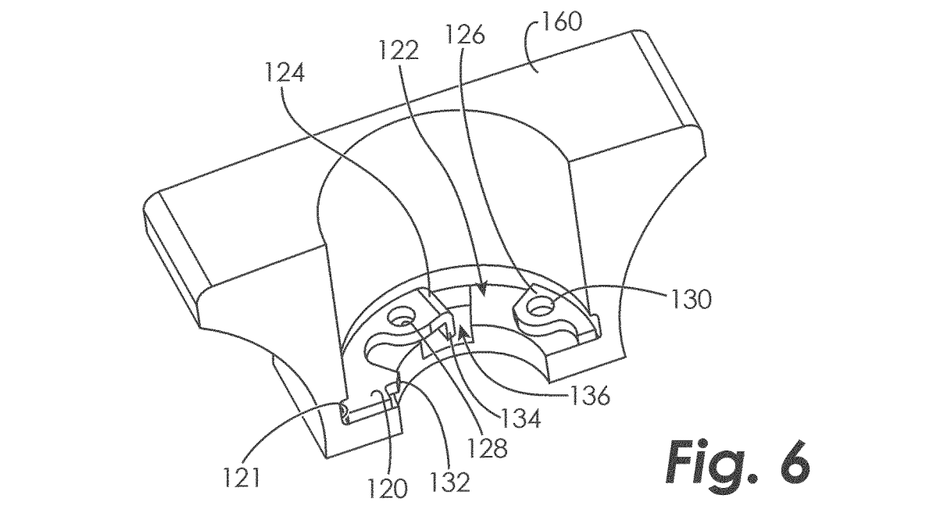
FIG. 6 is a schematic cross-sectional view of a blind fastener retainer installed on a component in an embodiment.
Figure 7:
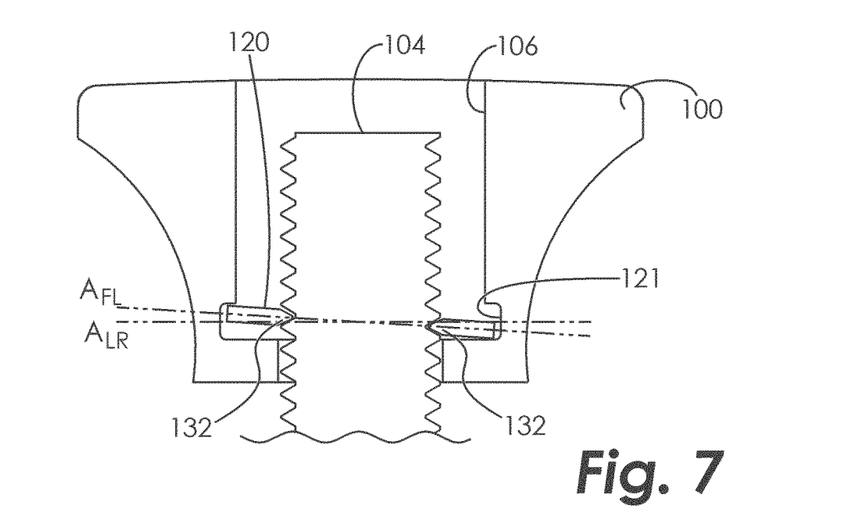
FIG. 7 is a schematic cross-sectional view of a blind fastener retainer and threaded fastener installed on a component in an embodiment.

FIGS. 5-7 illustrate one embodiment of a fastener lock 120 that will retain the fastener 104 within the upper recess 106 after the fastener 104 is backed out of the threaded insert 110. The fastener lock 120 may be disposed within a lock recess 121 formed into a wall of the upper recess 106. The diameter of the lock recess 121 is greater than the diameter of the upper recess 106. The fastener lock 120 may comprise a discontinuous washer having a void 122 therein defining fastener lock ends 124 and 126 and a discontinuous circular opening therethrough. The fastener lock may be formed from 17-7PH stainless steel, to name just one non-limiting example. In one embodiment, a diameter of the fastener lock 120 in its relaxed state is larger than a diameter of the upper recess 106. Squeezing the fastener lock 120 to bring the fastener lock ends 124 and 126 closer together operates to reduce the diameter of the fastener lock 120. In this reduced diameter state, the fastener lock 120 may be inserted into the upper recess 106 and placed into the lock recess 121. When the squeezing force is removed, the fastener lock 120 will attempt to resume its original diameter that is greater than the diameter of the upper recess 106. The fastener lock 120 is thereby retained within lock recess 121 and does not represent a danger of foreign object damage.

In order to facilitate squeezing of the fastener lock 120 to reduce its diameter, a hole (or indentation) 128 is provided in the fastener lock end 124, and a hole (or indentation) 130 is provided in the fastener lock end 126 in an embodiment. The holes 128 and 130 allow the fastener lock 120 to be engaged by a tool (not shown) that will apply the squeezing force to the faster lock 120.

The fastener lock 120 includes at least one extending tab 132. In the illustrated embodiment, two extending tabs 132 are shown. The extending tabs 132 are sized such that they will engage the thread of the threaded fastener 104 when it is disposed within the upper recess 106. Because the extending tabs 132 engage the thread of the threaded fastener 104, the threaded fastener 104 is prevented from falling back into the lower recess 108 and the components 100, 104 and 112 may be removed in an axial direction.

One or both of the fastener lock ends 124 and 126 may have an extension 134 formed thereon, wherein an axis of the extension 134 forms a non-zero angle with an axial plane in which the remainder of the fastener lock 120 is disposed. In one embodiment, the non-zero angle is substantially 90 degrees. A cavity 136 may be formed into the lock recess 121 to receive the extension 134. Rotation of the fastener lock 120 is thereby limited by interaction between the extension 134 and the cavity 136.

As shown in FIG. 7, a height of the lock recess 121 allows the fastener lock 120 to be disposed in a position where a fastener lock axial plane $A_{FL}$ is non-parallel to a lock recess axial plane $A_{LR}$. In this non-parallel orientation, the fastener lock 120 may position itself within the lock recess 121 to minimally impact the threads of the fastener 104 when they are engaged with the extending tabs 132.

Figure 8:
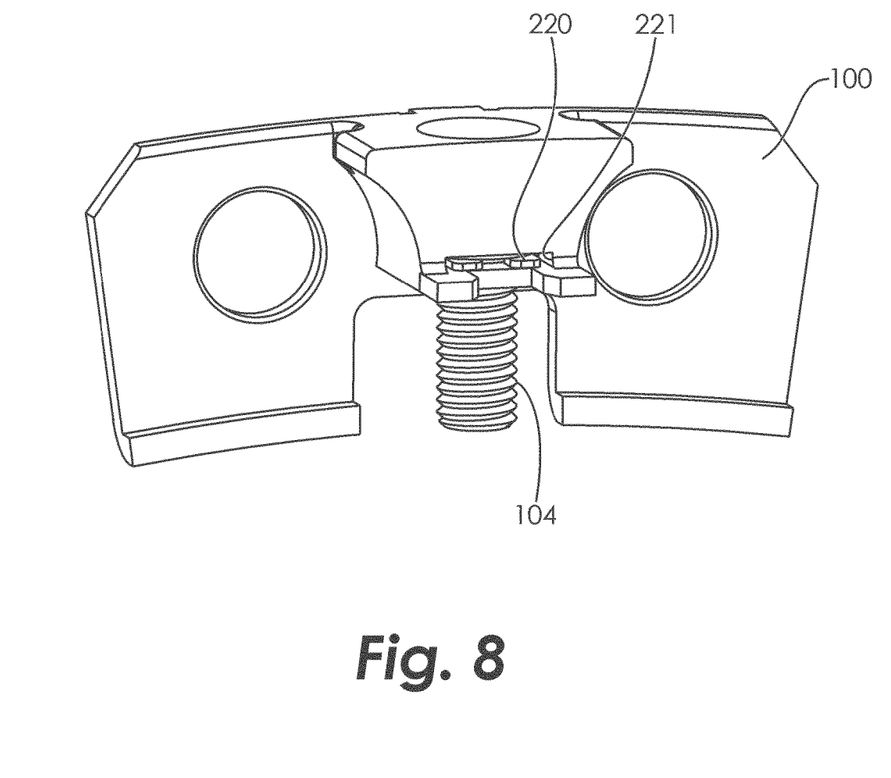
FIG. 8 is a schematic perspective view of a blind fastener retainer installed on a component in an embodiment.
Figure 9:
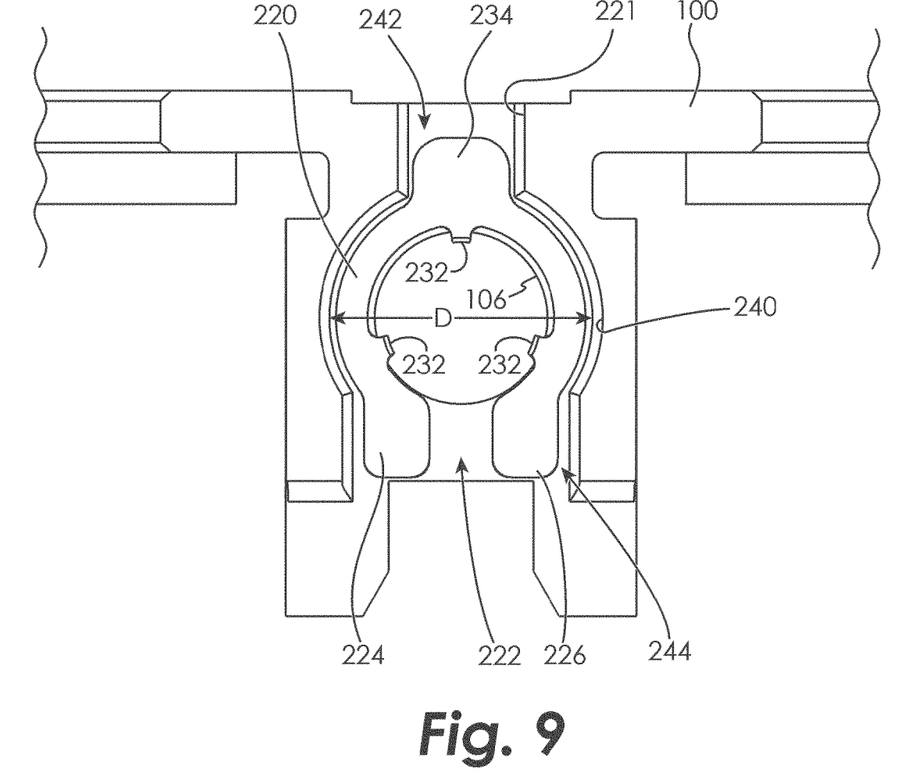
FIG. 9 is a schematic cross-sectional view of a blind fastener retainer installed on a component in an embodiment.
Figure 10:
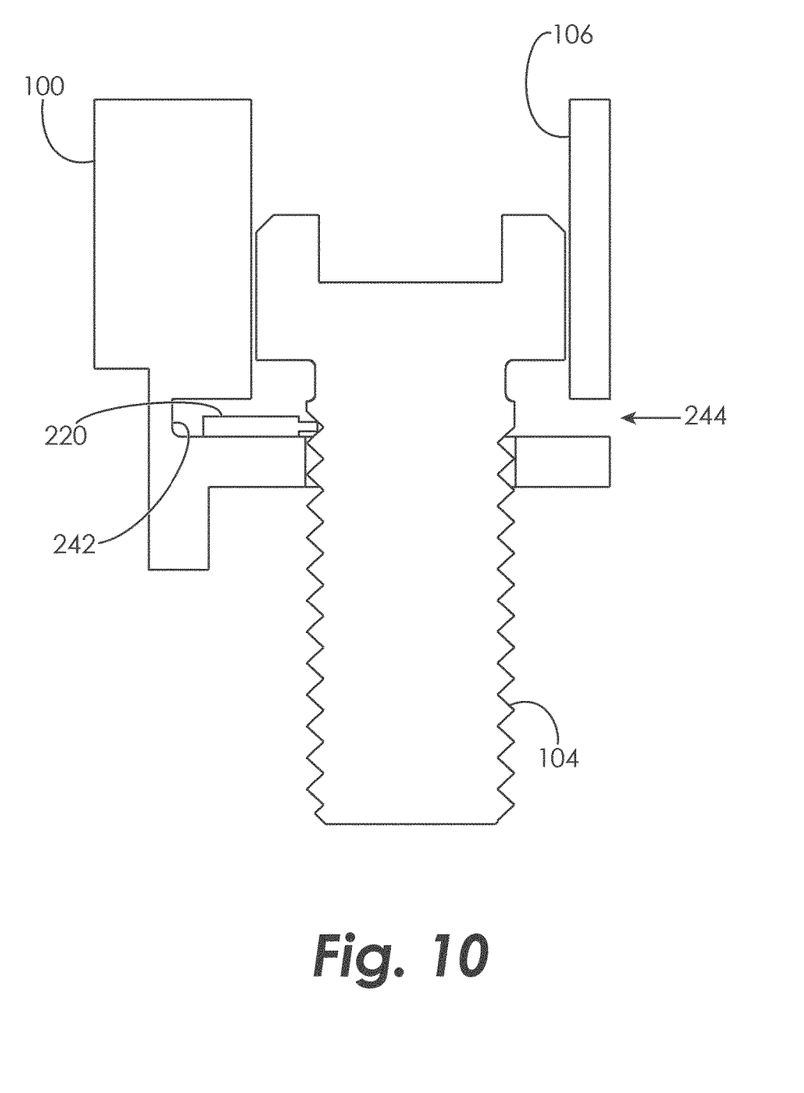
FIG. 10 is a schematic cross-sectional view of a blind fastener retainer and fastener installed on a bracket in an embodiment.

FIGS. 8-10 illustrate one embodiment of a fastener lock 220 that will retain the fastener 104 within the upper recess 106 after the fastener 104 is backed out of the threaded insert 110. The fastener lock 220 may be disposed within a lock recess 221 formed through a wall of the upper component 100 and into the upper recess 106. The lock recess 221 includes a central portion 240 having a diameter D. The diameter D of the central portion 240 of the lock recess 221 is greater than the diameter of the upper recess 106. The lock recess 221 further includes a distal portion 242 and a proximal portion 244. The distal portion 242 extends through a wall of the upper component 100 in one embodiment. The proximal portion 244 also extends through a wall of the upper component 100 and allows for insertion of the fastener lock 220 into the lock recess 221. The proximal portion has a width that is less than the diameter D of the central portion. The fastener lock 220 may comprise a discontinuous washer having a void 222 therein defining fastener proximal lock ends 224 and 226 and a discontinuous circular opening therethrough. The fastener lock 220 may also include a distal extension 234. The fastener lock 220 may be formed from 17-7PH stainless steel, to name just one non-limiting example.

Inserting the fastener lock 220 through the proximal portion 244 acts to apply a squeezing force to the fastener lock 220, causing the fastener lock ends 224 and 226 to move closer together which operates to reduce the diameter of the fastener lock 220. In this reduced diameter state, the fastener lock 220 may continue to be inserted through the proximal portion 224 and placed into the lock recess 221. When the fastener lock 220 is seated within the lock recess 221 the squeezing force is removed and the fastener lock 220 will attempt to resume its original diameter that is greater than the width of the proximal portion 222. The fastener lock 220 is thereby retained within lock recess 221 and does not represent a danger of foreign object damage.

The fastener lock 220 includes at least one extending tab 232. In the illustrated embodiment, three extending tabs 232 are shown. The extending tabs 232 are sized such that they will engage the thread of the threaded fastener 104 when it is disposed within the upper recess 106. Because the extending tabs 232 engage the thread of the threaded fastener 104, the threaded fastener 104 is prevented from falling back into the lower recess 108 and the lower component 102 may be removed in an axial direction. Rotation of the fastener lock 220 within the lock recess 221 is limited by interaction between the extension 234 and the distal portion 242 of the lock recess 221, as well as by interaction between the fastener proximal lock ends 224 and 226 and the proximal portion 244.

Similar to the embodiment illustrated in FIG. 7, a height of the lock recess 221 allows the fastener lock 220 to be disposed in a position where a fastener lock axial plane $A_{FL}$ is non-parallel to a lock recess axial plane $A_{LR}$. In this non-parallel orientation, the fastener lock 220 may position itself within the lock recess 221 to minimally impact the threads of the fastener 104 when they are engaged with the extending tabs 232.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. An assembly comprising:
    an upper component including an upper recess formed therethrough, the upper component further including an upper component wall;
    a lower component including a lower recess formed therethrough;
    a lock recess formed through the upper component wall and intersecting the upper recess; and
    a fastener lock at least partially disposed within the lock recess, the fastener lock including a discontinuous washer having a void formed therein defining a discontinuous circular opening formed therethrough and two fastener lock ends on either side thereof, at least one extending tab disposed on a periphery of the discontinuous circular opening, an extension disposed on at least one of the fastener lock ends, wherein an axis of the extension forms a non-zero angle with an axial plane in which the remainder of the fastener lock is disposed and wherein a hole is formed through each of the two fastener lock ends.

2. The assembly of claim 1, further comprising a threaded insert at least partially disposed within the lower recess.

3. The assembly of claim 1, wherein the lower recess is threaded.

4. The assembly of claim 1, wherein a diameter of the lock recess is greater than a diameter of the upper recess.

5. The assembly of claim 1, further comprising a cavity formed into the lock recess, wherein the cavity defines at least one cavity wall and rotation of the fastener lock is limited by interaction between the extension and the at least one cavity wall.

6. The assembly of claim 1, wherein a diameter of the fastener lock in a relaxed state is greater than a diameter of the upper recess.

7. The assembly of claim 1, wherein the fastener lock is formed from stainless steel.

8. The assembly of claim 1, wherein a height of the lock recess allows the fastener lock to be disposed in a position where a fastener lock axial plane is non-parallel to a lock recess axial plane.

9. The assembly of claim 1, further comprising a threaded fastener disposed in the upper recess and extending through the opening such that the at least one extending tab engages a thread of the threaded fastener.

10. The assembly of claim 1, wherein the lock recess comprises a central portion defining a central portion diameter, a distal portion and a proximal portion, the proximal portion extending through the upper component wall.

11. The assembly of claim 10, wherein a width of the proximal portion is less than the central portion diameter.

12. The assembly of claim 10, further comprising a distal extension disposed within the distal portion of the lock recess, wherein interaction between the distal extension and the distal portion of the lock recess limits rotation of the fastener lock.

* * * * *